United States Patent [19]
Wright

[11] 3,773,279
[45] Nov. 20, 1973

[54] HEAVY LOAD LIFTING BALLOON
[75] Inventor: Theron E. Wright, Brandon, S. Dak.
[73] Assignee: Raven Industries, Inc., Sioux Falls, S. Dak.
[22] Filed: May 11, 1972
[21] Appl. No.: 142,187

[52] U.S. Cl. .................................................. 244/31
[51] Int. Cl. ............................................... B64b 1/40
[58] Field of Search .................. 244/31, 33, 98, 142

[56] References Cited
UNITED STATES PATENTS
2,756,948  7/1956  Winzen .................................. 244/31
2,764,369  9/1956  Melton .................................. 244/31
2,993,667  7/1961  Cushman ............................ 244/142
3,023,982  3/1962  Huch .................................... 244/31

Primary Examiner—Duane A. Reger
Assistant Examiner—Jesus D. Sotelo
Attorney—Hill, Sherman, Meroni, Gross and Simpson

[57] ABSTRACT

A balloon construction having a general natural shape balloon envelope with a skirt surrounding the lower end and the skirt having ram-air openings catching air from the wind pressurizing the skirt and having the load lines integral with the skirt with the skirt maintaining the tapered shape of the balloon regardless of the collapse of the lower end of the balloon within the skirt due to balloon deflation.

9 Claims, 4 Drawing Figures

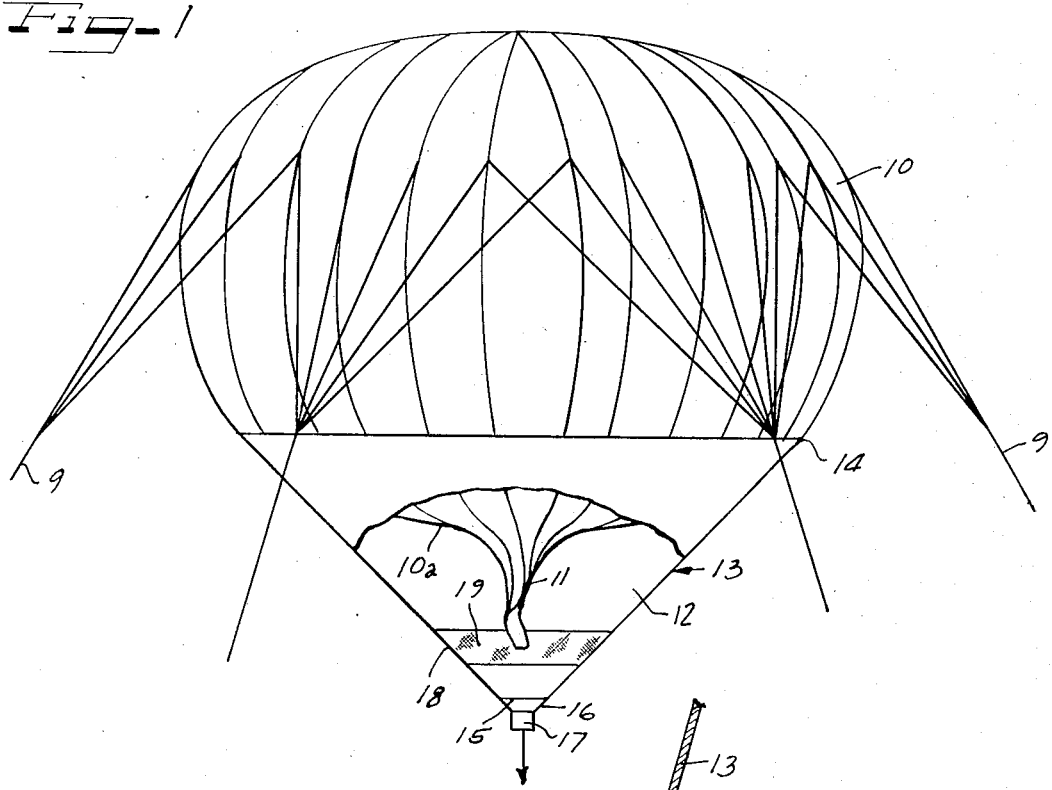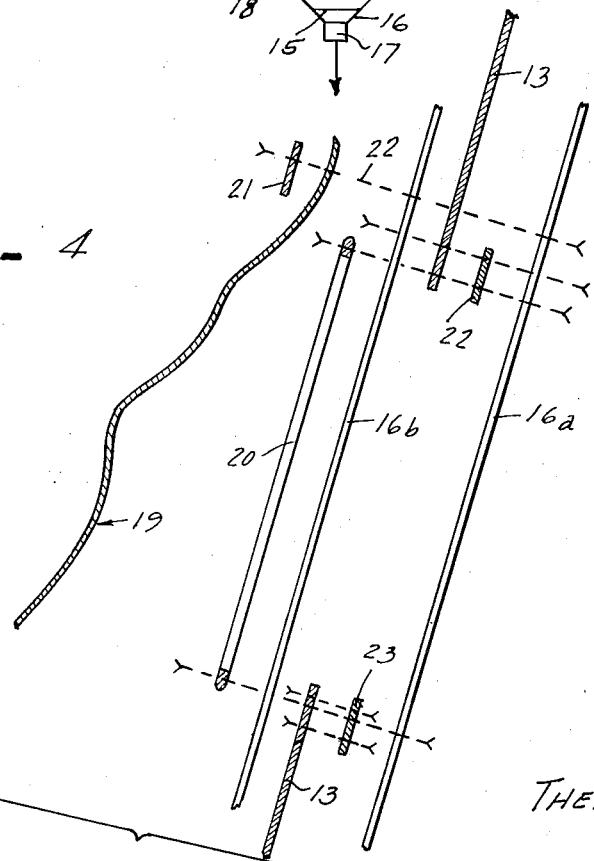

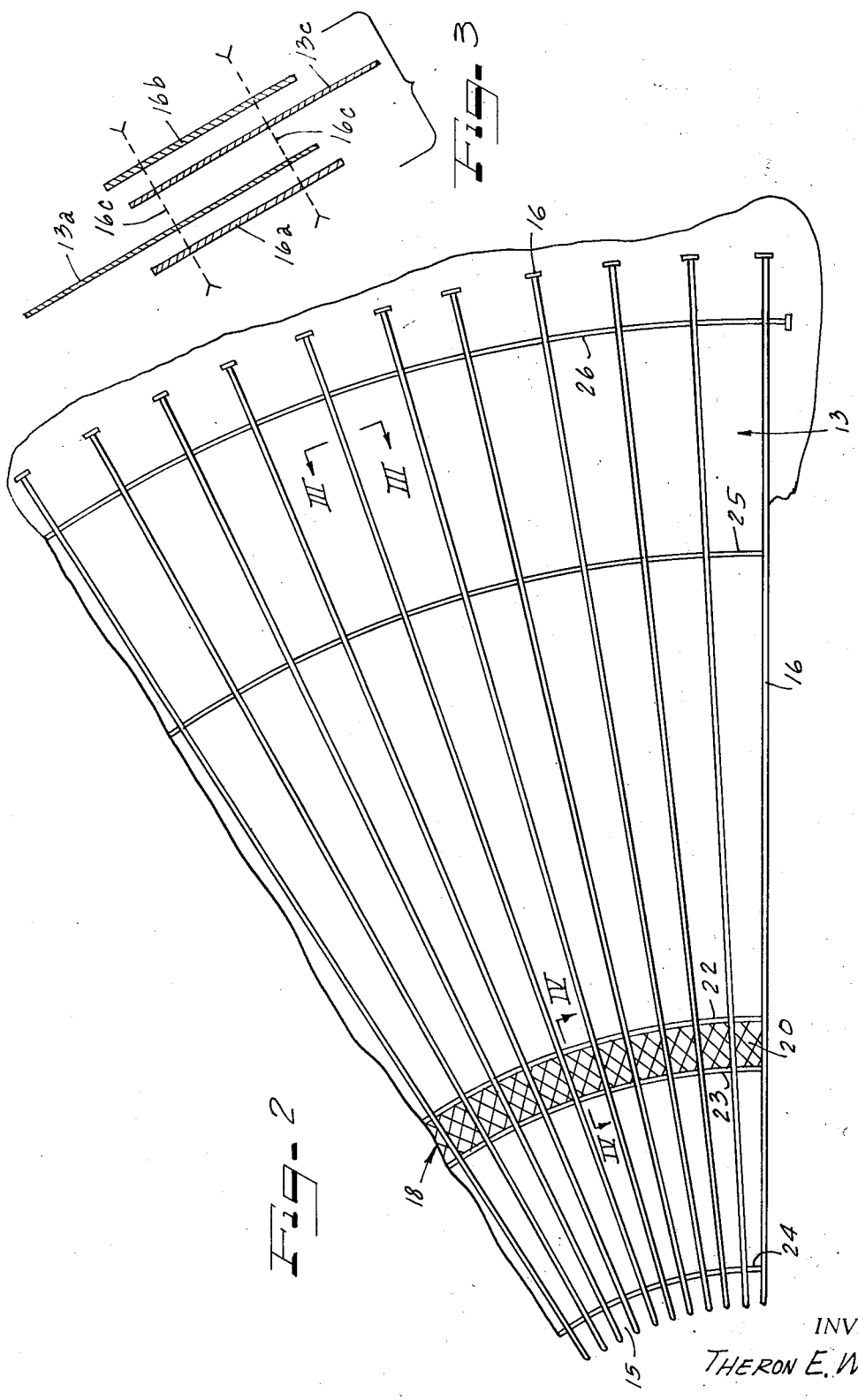

HEAVY LOAD LIFTING BALLOON

BACKGROUND OF THE INVENTION

The present invention relates to improvements in captive balloons and particularly to a balloon construction for handling heavy loads which substantially aids in the capability of controllably handling a large balloon in the wind and aids its stability in performance during operation.

In a tethered balloon such as used for logging or carrying similar large loads, various circumstances will be encountered which create difficulty in handling of designs heretofore available. Work balloons, which are capable of hauling large loads, must be capable of control in varying wind conditions both during inflation and during use inasmuch as practical application prevents them from being laid up solely due to winds. Also, changes in temperatures and barometric pressures will cause changes in volume and shape and the relative relationship of the load lines to the balloon. Each of these factors can cause distortion of the balloon due to wind pressures and difficulty in handling which will either adversely affect the balloon insofar as its stability and load carrying capability or insofar as the ability of the equipment to maintain the balloon under control without its becoming unstable and moving around uncontrollably and tearing. While the features of the invention are particularly useful and well adapted in a tethered balloon, they also may be used with advantage in a free balloon, but for convenience, the description will primarily make reference to tethered load carrying balloon operation.

A feature of the present invention is the provision of a sealed gas filled balloon wherein the volume of gas will change during operation, but the external shape and size, which is exposed to the wind, will not change. This is accomplished by providing a generally conically shaped shield, which has a rigid shape, and which is hollow so that the balloon envelope can expand into it. It is held rigid in part by being externally inflated, such as by ram air of the wind. In addition to the ram-air inflating the conically shaped shield at the bottom of the balloon, the ram-air pushes upward against the balloon envelope to help maintain its pressure when the gas within the envelope contracts.

An object of the present invention is to provide an improved balloon construction which is more stable at conditions of various stages of inflation so as to provide a cargo carrying balloon which can be better handled in the wind.

A further object of the invention is to provide an improved balloon construction wherein the force of the load on the balloon is more uniformly distributed over the surface of the balloon envelope.

A further object of the invention is to provide a balloon envelope construction wherein a smooth, nonwrinkled, nonfolding fabric is presented to the wind avoiding the formation of folds and bellows which catch the wind and cause the balloon to sway and dip and become uncontrollable.

A still further object of the invention is to provide an improved tethered cargo-carrying balloon which does not have to be fully deflated in adverse weather conditions or when temporarily not in use and wherein the balloon envelope is substantially taut under varying conditions of inflation so that it can be stably tethered and handled.

Another object of the invention is to provide a balloon envelope with a hollow shield at the bottom into which the folds of the lower part of the envelope can drape, and be protected from the wind, when the gas within the envelope contracts and the balloon envelope is less than fully inflated.

A still further object of the invention is to provide a balloon envelope with an auxiliary chamber attached thereto and exposed to the external surface of the balloon envelope and pressurized, so that when the gas within the envelope contracts, the pressure within the auxiliary chamber will depress the balloon envelope to maintain the pressure therein.

Other objects and advantages will become more apparent with the teaching of the features of the invention in connection with the disclosure of the preferred embodiment in the claims, specification and drawings in which:

DESCRIPTION OF THE DRAWINGS

FIG. 1 is a side elevational view with portions broken away for illustration, of a balloon constructed in accordance with the principles of the present invention;

FIG. 2 is a fragmentary plan view of the skirt of the balloon laid out to show its features of construction;

FIG. 3 is a fragmentary sectional view, shown in exploded form, taken substantially along the line III—III of FIG. 2; and FIG. 4 is a fragmentary sectional view shown in exploded form taken substantially along the line IV—IV of FIG. 2.

DESCRIPTION OF THE PREFERRED EMBODIMENTS

As illustrated in FIG. 1, the structure includes a balloon envelope 10 which is of large size so as to be capable of carrying logs or similarly heavy cargo. The envelope is formed of a plurality of shaped gores seamed to each other along their edges and are well-known to those versed in the art. The gore material is substantially gas-proof and is preferably an abrasion resistant material capable of withstanding the weather and a substantial amount of abrasion such as due to contact with load carrying lines. The envelope material may be a woven polyester base fabric impregnated with elastomeric compound. The elastomer appears on both the inside and outside surfaces of the fabric sandwich. A woven outer polyester material lined with a thin gas-impervious plastic film may also be used for this purpose, and the gores are attached to each other by heat sealing or by cement augmented by sewing. Placed over the seams are tapes which strengthen the balloon and aid in attaching the load lines 16 which extend to the bottom of the balloon for the attachment of a ring 17 or similar load attaching means.

The balloon gores are cut so that the finished balloon will have a generally natural shape, and as will be recognized by those skilled in the art, this is the shape which has been adopted for balloons of various usages which is the shape of the natural gas bubble and produces a balloon envelope wherein the horizontal and vertical stresses are minimized.

At the lower end of the balloon is attached a conical skirt 13. The skirt provides a closed chamber 12 exposed on one side of the balloon envelope. The chamber permits the envelope to expand into it as the gas expands. The chamber is pressurized so that as the gas in the balloon envelope contracts, it will press the envelope upwardly within the chamber to maintain a pressure in the upper portion of the balloon envelope. The chamber also provides a wind protective shield with the folds of the balloons being collected within the chamber and the outer surface of the skirt 13 presenting a smooth taut surface to the wind.

The skirt 13 is attached along its upper circumference at 14 to the balloon envelope 10 below the equator thereof, i.e., the location of maximum diameter. The lower end of the balloon envelope is shielded and protected within the skirt. Balloon envelope folds 11, which form when the gas in the envelope 10 contracts, are protected within the chamber 12. The chamber 12 formed by the skirt 13 is maintained pressurized so as to help the skirt maintain its conical shape and to present a smooth external shape to the wind. The pressure in the chamber 12 also presses up against the balloon envelope helping keep it taut and pressurized when the gas therein contracts.

In usual balloon constructions when the balloon becomes partially deflated, as illustrated by the lower end 11 of the balloon envelope in FIG. 1, the wind will catch in the folds of this lower end and cause it to whip around and tear or to create general instability in the balloon envelope so that it will be difficult to hold with the tethering lines which are shown generally at 9.

When the balloon envelope is completely inflated, the bottom forms a conical shape substantially filling the contour inside of the skirt 13. However, when the gas within the balloon contracts, and the balloon envelope is not fully inflated, the gas bubble tends to form a flat bottom within the chamber 12 at a level at which the internal gas pressure equals the outside atmospheric pressure. This level is the headline. The excess envelope fabric within the chamber 12 tends to form a flat bottom at the headline with the excess fabric dangling below the headline in the form of loose folds, wrinkles or a "dewlap." The height of the headline may vary from the bottom of the chamber 12 (when the envelope is fully inflated) to as high as the skirt top 14, FIG. 1, where the skirt is attached to the envelope. This is the point of minimum desirable inflation. At this point all of the envelope fabric within the skirt would be hanging in loose folds. As the gas within the balloon envelope 10 expands, and the headline 10a moves down within the chamber 12, air within the chamber is permitted to escape. As the gas within the balloon 10 contracts, and the headline 10a moves upwardly within the chamber 12, pressurized air within the chamber fills the space vacated by the portion of the balloon envelope that contracts within the chamber 12.

The skirt 13 is provided with means for maintaining the skirt pressurized. This is shown in the preferred arrangement as being provided by ram-air openings in the annular band between the dotted lines 18 of FIG. 1. These ram-air openings are controlled by a valve flap 19 which closes the openings to internal pressure, but which opens them when they are presented to the wind so that a constant internal positive pressure is maintained within the skirt 13. Also, if the construction is used with a free balloon, or with a tethered balloon which ascends to some height, the ram-air openings will open as the balloon descends rapidly to pressurize the interior of the skirt 13.

It is contemplated that in certain circumstances, the skirt or ballonet may be pressurized by means other than ram-air openings such as by providing wind turbines or propellers or mechanically driven blowers.

The skirt is provided with pressure relief opening means which permit the escape of air. This will occur with atmospheric pressure decrease or with increase of temperature of the gas within the balloon such as due to sunlight. It will also occur with a free balloon as it ascends to higher altitudes. This air escape opening means is provided in the form of an opening 15 at the lower end of the skirt. This opening means may be provided instead by utilizing a skirt material of limited porosity, or both an opening 15 plus porous material may be employed.

The skirt material is such that it provides balloon envelope ground protection and is built of a rugged fabric with high tear resistance to serve this function and of greater scuff resistance than the material of the balloon envelope. A closely woven nylon is well suited for the purpose with the porosity of a predetermined value. The opening 15, of course, can be chosen to augment the porosity of the nylon to obtain the desired maximum total opening for the skirt. The maximum total opening will be such that it will allow air to escape from the chamber 12 at an adequate rate with the maximum rate of gas expansion within the balloon envelope and the resultant moving downward of the headline 10a into the chamber 12.

The ram-air pressurization valves must be of a size so that they are larger than the balloon skirt air escape means. Thus, the chamber 12 will remain pressurized, and the skirt 13 will remain full and taut, i.e., the entrance of air through the ram-air pressurization valves will be greater than the escape of air through the air escape opening.

A feature of the structure is that the skirt applies a circumferential constricting force on the envelope at the point 14 where it is attached. The diameter of the skirt is equal to the diameter of the fully inflated balloon envelope so that as the balloon envelope deflates, the inflated skirt will maintain the envelope fabric under tension. This causes the headline 10a of the balloon to remain lower than it otherwise would. These factors enable the envelope to remain smooth and to resist distortion due to wind pressures.

FIGS. 2 through 4 illustrate further details of construction of the skirt. The load lines 16 are suitably attached at their upper ends at the point 14 in FIG. 1 by tapes or rings 16', FIG. 2. These may be attached to the tapes between the gores of the balloons or horizontal patches 16" may be employed for strengthening the balloon material. The load lines 16 may be formed of webbing in double layered straps 16a and 16b, FIG. 3. The straps are sewed to each other by threads 16c that pass through the edges of the gores 13a and 13c of the skirt. The skirt is formed in gores to provide the conical shape.

To aid in maintaining the circumferential spacing of the load lines 16 and afford additional circumferential strength, annular horizontal straps 24, 25 and 26 are provided at different vertical locations around the skirt 13. These may be held in place by being sewn to the load lines.

As illustrated in FIGS. 2 and 4, the ram-air inflation openings are provided in an annular band between the load lines and between annular straps 22 and 23. The material of the skirt is interrupted in this location and the space is filled with an open netting 20 which readily passes ram-air. The edges of the netting are sewed to the load lines and to the edges of the skirt material as indicated schematically by the dotted lines in FIG. 4.

Inside of the ram-air netting 20 is the ram-air valve flap 19. This is an annular band of flexible material attached at its upper edge to the skirt and hanging down loosely over the ram-air netting 20. With pressure within the skirt, the flap 19 will close the ram-air openings. However, when facing the wind, or when the balloon is descending, the force of the outside air will carry the flap 19 away from the openings so that the skirt 13 will remain pressurized.

Thus, the annular ram-air valve band will open on the windward side of the balloon and will close on the downwind side so that the skirt material will remain pressurized. Also, the tension of the load lines tends to hold the skirt material in its conical form.

The skirt and the load lines coact to act as a single suspension member and carry the force of the load up to the material of the balloon envelope. The force of the load will be substantially uniformly distributed over the entire circumference of the balloon envelope at the location 14 where the skirt is attached to the balloon envelope, and this avoids local high stress concentration.

The combination of constriction of the upper end of the skirt and the pressurized skirt considerably increase the balloon's resistance to wind pressure distortion and thus increase the operating limits of the unit. The skirt with the integral suspension straps acts as a unit suspension member to carry the loads in lifting force between the envelope and the load attachment.

In operation the chamber 12 within the skirt 13 remains under pressure. The skirt allows the gas within the envelope to change its volume under temperature and barometric pressure without changing the shape of the exposed portion of the envelope and without substantial change in skin tension of the exposed envelope fabric to maintain the entire unit taut and resist wind pressures. The skirt acts as a windshield for the bottom of the envelope. With decreased gas volume, the envelope fabric is slack and flaccid at the lower end and would be severely damaged by direct impact, and this is avoided with the presence of the skirt. This also permits the balloon to be pulled down against the ground for inspection or repair work without danger of scuffing or tearing of the envelope material.

As the balloon rises, or as pressure within the balloon envelope increases, the lower end of the envelope can fill up within the skirt and the porosity of the skirt material plus the opening at the nadir permits the escape of air.

Major distortion due to wind impact pressure cannot only occur in this skirt, but also cannot occur in the envelope. Pressurizing the skirt chamber increases the internal pressure of the entire balloon system to better enable it to resist wind impact pressures.

I claim as my invention:

1. A balloon construction comprising in combination,
    a balloon envelope having a rounded upper end with a tapered conical lower end and an inflation opening at the lower end,
    a conically shaped skirt surrounding the lower end of the envelope with its larger upper end attached to the envelope below the equator thereof and tapering to a smaller lower end and providing an expansion chamber for said envelope lower end and an outer shield for the lower end of the balloon envelope, said skirt retaining its conical shape during flight, said envelope lower end being free to expand and contract within the chamber provided by the skirt, and load lines attached to the balloon envelope and extending downwardly for supporting a load beneath the skirt.

2. A balloon construction in accordance with claim 1 wherein the skirt is conical and said load lines are integral with the skirt so that the skirt and lines function as a suspension member and the load is transmitted to the balloon envelope along the circumference of the upper end of the skirt.

3. A balloon construction in accordance with claim 1 including means for pressurizing the chamber formed by the skirt.

4. A balloon construction in accordance with claim 3 wherein said pressurizing means includes ram-air valve means having a skirt opening with a flap over said opening which separates from the opening when facing external wind to admit air into the skirt and which closes when facing away from the wind.

5. A balloon construction in accordance with claim 3 including an annular area in the skirt with openings therein and a downwardly depending flexible valve band within the skirt secured at its upper end to close said openings due to skirt internal pressure and to permit the flow of air into the skirt due to movement of external air against the skirt.

6. A balloon construction in accordance with claim 1 wherein the skirt is formed of a fabric having a greater scuff resistance than the material of the balloon envelope to protect the lower end of the envelope with ground engagement.

7. A balloon construction in accordance with claim 1 wherein the skirt has a ram-air opening with valve means to close the opening with internal pressure within the skirt and including relief opening means in the skirt to permit the escape of air as the gas within the envelope expands and the envelope fills into the skirt.

8. A balloon construction in accordance with claim 7 wherein the size of the ram-air opening is greater than the relief opening means so that the flow of air into the skirt through the ram-air openings will be greater than the escape of air through the relief opening means to maintain the skirt pressurized.

9. A balloon construction in accordance with claim 7 wherein the skirt material is porous and the porosity of the material provides said relief opening means.

* * * * *